US012402212B2

(12) United States Patent
Walz et al.

(10) Patent No.: US 12,402,212 B2
(45) Date of Patent: Aug. 26, 2025

(54) PTC HEATING CELL

(71) Applicant: Eberspächer catem GmbH & Co. KG, Herxheim (DE)

(72) Inventors: Kurt Walz, Hagenbach (DE); Stefan Plewnia, Karlsruhe (DE); Sascha Barner, Hagenbach (DE)

(73) Assignee: Eberspächer Catem GmbH & Co., Herxheim (DE)

(*) Notice: Subject to any disclaimer, the term of this patent is extended or adjusted under 35 U.S.C. 154(b) by 446 days.

(21) Appl. No.: 17/093,994

(22) Filed: Nov. 10, 2020

(65) Prior Publication Data

US 2021/0144811 A1 May 13, 2021

(30) Foreign Application Priority Data

Nov. 12, 2019 (DE) .................... 10 2019 217 453.1

(51) Int. Cl.
*H05B 3/00* (2006.01)
*H05B 3/03* (2006.01)
*H05B 3/44* (2006.01)

(52) U.S. Cl.
CPC ............. *H05B 3/0023* (2013.01); *H05B 3/03* (2013.01); *H05B 3/44* (2013.01); *H05B 2203/02* (2013.01)

(58) Field of Classification Search
CPC ..... A61F 2007/0074; A61H 2201/0235; F24H 2250/04; F24H 9/1827; F24H 9/1872; H01H 2033/163; H01M 2200/106; H02H 9/026; H05B 2203/02; H05B 3/00; H05B 3/0004; H05B 3/0023; H05B 3/03; H05B 3/06; H05B 3/16; H05B 3/18; H05B 3/44
See application file for complete search history.

(56) References Cited

U.S. PATENT DOCUMENTS

| | | | | | |
|---|---|---|---|---|---|
| 5,922,233 | A * | 7/1999 | Ohashi | H05B 3/565 219/528 |
| 2018/0160478 | A1 * | 6/2018 | Bohlender | F24H 3/0429 |
| 2019/0335541 | A1 * | 10/2019 | Marlier | H05B 3/50 |

FOREIGN PATENT DOCUMENTS

| | | | | |
|---|---|---|---|---|
| CN | 1 06 060 977 A | 10/2016 | |
| DE | 695 32 131 T2 | 8/2004 | |
| DE | 10118599 B4 * | 7/2006 | H05B 3/14 |
| DE | 10 2011 081 830 A1 | 2/2013 | |
| DE | 10 2017 208 086 A1 | 11/2018 | |
| EP | 3334242 | 1/2020 | |

* cited by examiner

*Primary Examiner* — Steven W Crabb
*Assistant Examiner* — Theodore J Evangelista
(74) *Attorney, Agent, or Firm* — Boyle Fredrickson, S.C.

(57) ABSTRACT

A PTC heating cell has a cuboid-shaped PTC element and two metallizations electrically separated from each other and provided on the surface of the PTC element for the introduction of current to the PTC element. The two metallizations are provided as strips formed over an entire longitudinal extension (L) of the PTC element on diagonally oppositely disposed surface sections of the PTC element.

11 Claims, 1 Drawing Sheet

PTC HEATING CELL

BACKGROUND OF THE INVENTION

1. Field of the Invention

The present invention relates to a PTC heating cell with a cuboid-shaped PTC element and metallizations that are electrically separated from one another. Two metallizations are provided on the surface of the ceramic PTC element for introducing current to the PTC element.

2. Background of the Invention

Such a PTC heating cell is generally known. In the typical PTC heating cells, which are used in the field of motor vehicle air conditioning presently at issue as elements of a motor vehicle heating device for heating air or a liquid medium, the metallization is typically located on oppositely disposed main side surfaces of the PTC Element. This main side surface of the PTC element is the largest surface of the PTC element. With a cuboid-shaped PTC element, the main side surfaces are disposed opposite one another and extend parallel to one another. The current path through the PTC element is accordingly at a right angle to the main side surfaces and in the thickness direction of the PTC element.

If a voltage is applied to a PTC element, then it heats up. With the aforementioned metallization of the ceramic PTC element, which is generally customary in prior art, the ohmic resistance of the latter must be increased as the voltage increases. In addition to the PTC region of the characteristic curve, the latter also shows an NTC region. This has a negative impact on the operation at low temperatures. The shape of the characteristic curve is voltage-dependent. The NTC behavior is more pronounced at a higher specific resistance of the PTC element. The voltage dependency (varistor effect) increases with a lower number of grain boundaries between the individual electrodes. The grain boundaries are defined by the individual ceramic grains which, when compacted, result in the PTC element.

SUMMARY

The present invention provides a PTC heating cell that is compact in structure and exhibits the best possible heating and heat dissipation behavior.

In accordance with a first aspect of the invention, a PTC heating cell is provided that includes a cuboid-shaped PTC element, and two metallizations that are electrically separated from each other and that are provided on a surface of the PTC element for the introduction of current into the PTC element. The two metallizations are formed over the entire length or longitudinal extension (L) of the PTC element as strips. The strips are located on diagonally oppositely disposed surface sections of the PTC element.

The strips, which may be relatively thin strips, are typically designed as strictly rectangular strips. The strips are typically located on oppositely disposed main side surfaces, but offset diagonally. Each of the individual strips is assigned a specific polarity. In addition to the previously mentioned strips, there is typically no metallization for the introduction of current provided on the surface of the PTC element. The electrodes in the form of strips cause a diagonal flow through the PTC element. The current path through the PTC element is accordingly considerably longer than in a conventional structure in which the current passes through the PTC element in the thickness direction. It is thus possible to create a PTC heating cell with a relatively thin structure in which the current passes through a maximum number of grain boundaries. The current path is also longer than a current path when the PTC element is contacted on oppositely disposed face side surfaces that connect the main side surfaces. Because, with electrodes disposed diagonally opposite, the current path is composed of the width and additionally the thickness of the PTC element.

The thickness of the PTC element can be reduced to up to 0.9 mm for voltages up to 800 V. With this thickness, the risk of fracture due to thermal stress is excluded. The thickness of the PTC element (without metallization) is preferably in a range from 0.9 mm to 2 mm.

The PTC heating cells and therefore the electrical heating devices for motor vehicles can therefore be designed comprising such heating cells that are very compact without impairment of the thermal performance of the PTC element. The voltage dependency of the characteristic curve can be reduced due to the relatively long current path. A higher operating voltage gives rise to lower specific resistances, which reduces the NTC effect.

The PTC element according to the invention is accordingly particularly suitable for high-voltage applications, specifically for the formation of electrical heating devices for electromobility. The on-board voltage available for the drive can also be used directly to air-condition the vehicle and in particular the interior or to heat technical components of the electric vehicle. Voltages of up to 1,000 VDC, typically between 600 and 1,000 VDC, are viewed as being a high voltage range. The PTC element can be controlled by PWM. This pulse width modulation is typically set in a high kHz up to the MHZ range.

It is understood that the advantages mentioned above can only be used if the strip has a width of less than half the width of the PTC element. The same applies to the ratio of the thickness of the metallizations to the thickness of the PTC element. In order to obtain a varistor effect of at least 50%, i.e. a 10% lower startup current, the ratio B/b or D/d, respectively, must be at least two, where B=the width and D=the thickness of the cuboid-shaped PTC element and b=the width and d=the thickness of the electrode strip; the ratio should particularly preferably be between 3 and 6.

The electrode strips preferably extend in the width direction up to the adjacent edge of the cuboid-shaped PTC element. The electrode strips then have the greatest possible distance from one another.

In the longitudinal direction as well, the strips should start at an edge of the cuboid-shaped PTC element. The strips preferably extend from edge to edge and accordingly over the entire length of the PTC element.

According to a preferred development of the present invention, a contact rail is provided for each of the metallizations for contacting the electrode strips. This contact rail is typically formed from a metal, particularly preferably from sheet metal material. At its free end projecting over the PTC element, the contact rail typically forms a terminal lug for plug contacting the PTC element. The terminal lug is the male element of an electrical plug connection. The contact rail can be adhesively bonded or soldered to the metallization.

The contact rail particularly preferably engages over the PTC element and the associated metallization. For this purpose, the contact rail is formed to be U-shaped in cross section. This U-shaped contact rail has two oppositely disposed legs that accommodate the PTC element between them, and a web that connects the two legs. The two legs clamp the PTC element between them, where the metallization of the electrode is provided on one side between the ceramic material of the PTC element and the contact rail. Only there is the power current introduced into the PTC element. The uncoated surface region of the ceramic PTC element has a resistance in the M-ohm range. This part then remains non-energized, even if no further insulating material is provided between the respective leg of the U-shaped rail and the oppositely disposed ceramic surface. The PTC element can thus be clamped in the U-shaped contact rail in a relatively simple manner.

With regard to a clamping that is secure, permanent and also forgiving in terms of certain manufacturing tolerances, the spring rail preferably has spring projections formed integrally thereon which abut against the metallization with resilient pretension. Corresponding spring projections are typically provided on both of the oppositely disposed legs so that the spring projections abut against the PTC element or the metallization, respectively, on both sides. It is understood that several spring projections are typically provided consecutively in the longitudinal direction in order to distribute the clamping force over to the PTC element evenly in the longitudinal direction.

According to a further preferred embodiment of the present invention, an injection mold coating made of insulating plastic material is provided. This injection mold coating is produced by placing the PTC element with the metallization and the contact rails provided thereon into an injection mold in which the contact rails are injection mold coated. The injection mold coating surrounds the contact rails, but otherwise leaves exposed regions of the PTC element that dissipate heat. The insulating plastic forming the injection mold coating accordingly seals the contact rails entirely. Only the terminal lug can protrude through the injection mold coating and be exposed on the outer side of the PTC heating cell for its electrical connection. The main side surfaces immediately adjacent to the contact rails and the metallization are not injection mold coated with the plastic material and remain free. Because these main side surfaces serve to dissipate the heat generated by the PTC heating cell. The face side surfaces of the cuboid-shaped PTC element, which extend at a right angle thereto and are not contacted or engaged over by the contact rails, can form the outer surface of the PTC heating cell or be provided with insulation that is formed by the injection mold coated plastic material.

For injection mold coating, it is preferable to round off the edges of the PTC element to be surrounded by the injection mold coating. A radius and no sharp edge is typically provided there with the injection mold coating.

According to a further preferred embodiment of the present invention, surfaces of the PTC element that are not provided with the metallization, in particular the oppositely disposed main side surfaces of the PTC element, on the edge of which the metallization is provided, are covered with an insulating layer. A heat-dissipating element in the form of a corrugated rib typically abuts this insulating layer directly if the previously mentioned heating cell is the heat-dissipating element of an air heater with a layered structure formed by the heating cell and corrugated rib layers abutting thereagainst on both sides. The insulating layer can also wrap around all open surfaces of the ceramic PTC element. The insulating layer typically encloses the PTC element in such a way that an external medium cannot reach the current-carrying parts of the heating cell. Configured in this way, the PTC heating cell can also be employed as a heating rib in a heating chamber of a liquid heater which is separated by a partition wall from a connection chamber in which the terminal lugs of the heating cell can be exposed in order to provide them with a connection to the power current. The injection mold coating can there form a sealing collar which is penetrated by the regions of the contact rail forming the terminal lug on the side opposite the PTC element and extending at the edge beyond the PTC element. This sealing collar can be sealingly accommodated in a plug contact receptacle of a partition wall which separates the heating chamber from the connection chamber, as is known from EP 3 334 242 A1. With the appropriate insulation, the heating cell can then itself be used as a heating rib of the previously known electrical heating device for heating in a motor vehicle.

In terms of better attaching the insulating layer, it is proposed according to a preferred development of the present invention that the contact rail and/or the injection mold coating engages over a longitudinal edge of the insulating layer provided on a main side surface of the PTC element and thus integrates it in a positive-fit manner in the PTC heating cell. In the case of an injection mold coating, it is possible to seal the insulating layer by way of the injection-molded plastic material.

BRIEF DESCRIPTION OF THE DRAWINGS

The present invention shall be explained schematically below using an embodiment in conjunction with the drawing, in which.

DETAILED DESCRIPTION

Figure 1:
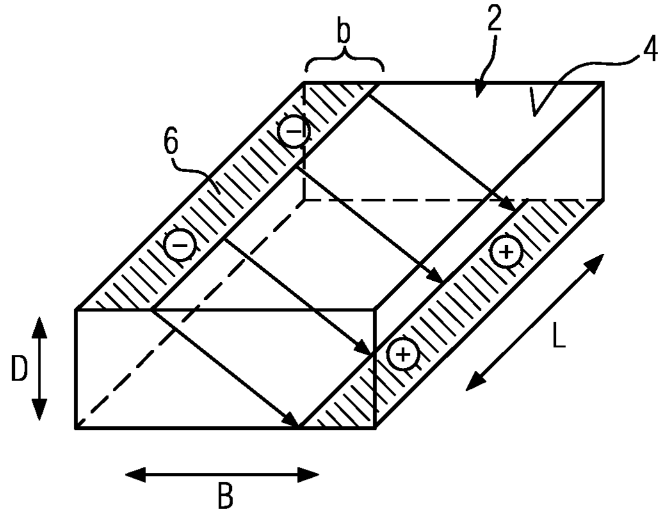
FIG. 1 shows a perspective face side view of a PTC heating cell.

FIG. 1 shows a cuboid-shaped PTC element 2. The longitudinal direction is marked as L, the width direction as B and the thickness direction as D. Oppositely disposed main side surfaces 4 span the width direction B and the longitudinal direction L. Strip-shaped metallizations 6 are provided on the edge of each main side surface 4. They extend in the longitudinal direction L from edge to edge. In the width direction B, the metallizations 6 each start at the edge which laterally defines the main side surface 4. The metallization 6 has a rectangular cross section and is applied to the ceramic main side surface 4 by sputtering. The two metallizations 6 are configured identically and associated with oppositely disposed longitudinal edges. The polarities of the metallizations 6 are marked as + and –. Arrows within the PTC element 2 illustrate the current path through the PTC element 2. In the embodiment shown, the width b of the strip 6 corresponds to approximately 20% of the width B of the PTC element 2.

Figure 3:
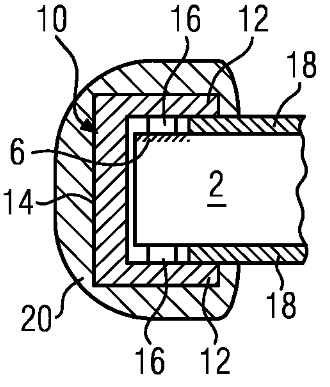
FIG. 3 shows a sectional view of the edge region of the embodiment with an injection mold coating.
Figure 2A:
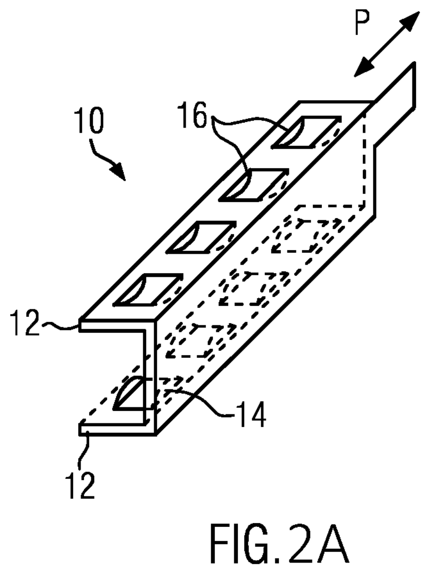
FIGS. 2A and 2B show two variants for contact rails for electrically contacting the embodiment.
Figure 2B:
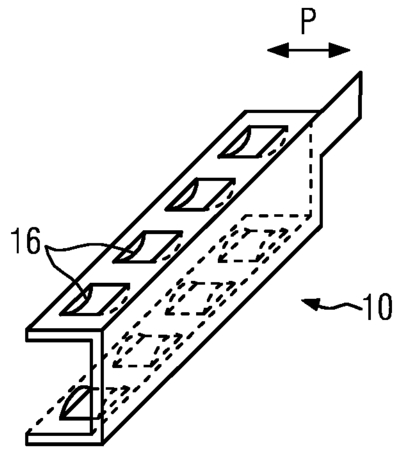

Contact with the power current es established by way of two contact rails 10 which are shown by way of example in FIGS. 2A and 2B. The respective contact rails 10 are U-shaped in cross section with oppositely disposed legs 12 which are connected to one another by a web 14. Spring projections 16 formed by punching and bending project from the inner surfaces of the legs 12. They form ramp surfaces in the embodiment according to FIG. 2 and ascend in the longitudinal direction of the contact rail 10 and therefore in the longitudinal direction and thus enable the PTC element to be introduced in the direction of the arrow P. In the embodiment according to FIG. 2B, the ramp surfaces are provided at a right angle thereto, so that the PTC element 2 can be pushed in the width direction in between the legs 12. The legs 12 abut with their spring projections 16 against the PTC element 2. The spring projections abutting against the metallization 6 are used for introducing the power current via the contact rail 10, whereas the oppositely disposed legs 12 are only used for mechanical attachment. Since a metallization and therefore an electrode is lacking there on the surface of the ceramic PTC element 2, there is no introduction of the power current there FIG. 3 shows a sectional view for a variant in which an insulating layer 18 in the form of a ceramic plate or a plastic film is placed on the region of the main side surface 6 that is not provided with the metallization 6. The legs 12 of the contact rail 10 engage over the edge region of the insulating layer 18 extending in the longitudinal direction L which is accordingly mechanically secured. FIG. 3 also illustrates an injection mold coating, denoted with reference numeral 20, made of insulating plastic material which engages over the contact rail 10 as well as an extended edge region of the insulating layer 18 and seals the contact rail 10. The outer surface of the insulating layer 18 therefore forms the heat-dissipating outer surface of the PTC heating cell. The latter can be introduced directly as a heating element into an electric heating device of a motor vehicle for heating a liquid or gaseous medium.

The invention claimed is:

1. A PTC heating cell comprising:

a cuboid-shaped PTC element, and two metallizations that are electrically separated from each other and that are provided on a surface of the PTC element for the introduction of current thereinto, wherein the two metallizations are provided as strips formed over an entire longitudinal extension (L) of the cuboid-shaped PTC element on diagonally oppositely disposed surface sections of the cuboid-shaped PTC element, wherein a current path between the two metallizations is only oriented diagonally through a thickness of the PTC element, wherein a single area portion of each of the oppositely disposed main side surfaces of the cuboid-shaped PTC element that is not provided with the metallization is covered with an insulating layer;

wherein two contact rails extend in a longitudinal direction of the cuboid-shaped PTC element, each of which is respectively associated with one metallization and each of which is formed to be U-shaped and clamp the cuboid-shaped PTC element, associated metallization, and insulating layers;

wherein each of the contact rails has a plurality of spring projections that abut against the associated metallization under resilient pretension and abut against a main side surface of the PTC element under resilient pretension; and wherein a mold coating encapsulates the contact rails and an edge region of the insulating layers and leaves heat-dissipating surfaces of said the cuboid-shaped PTC element free.

2. The PTC heating cell according to claim 1, wherein the strips have a width (b) of less than half a width of the cuboid-shaped PTC element.

3. The PTC heating cell according to claim 2, wherein the strips have a width (b) of less than a quarter of the width of the cuboid-shaped PTC element.

4. The PTC heating cell according to claim 1, wherein the strips extend in a width direction (B) of the cuboid-shaped PTC element up to an adjacent edge of the cuboid-shaped PTC element.

5. The PTC heating cell according to claim 4, wherein the strips extend in a longitudinal direction of the cuboid-shaped PTC element from edge to edge.

6. The PTC heating cell according to claim 1, wherein the mold coating is an injection mold coating made of an insulating plastic material.

7. The PTC heating cell according to claim 6, wherein each contact rail and the injection mold coating engage over a longitudinal edge of the insulating layer.

8. The PTC heating cell according to claim 6, wherein each contact rail and the injection mold coating engage over a longitudinal edge of an insulating layer.

9. The PTC heating cell according to claim 6, wherein the injection mold coating engages over a longitudinal edge of an insulating layer.

10. The PTC heating cell according to preceding claim 1, wherein the area portions of the oppositely disposed main side surfaces of the cuboid-shaped PTC element covered with the insulating layer are spaced apart from edges of the cuboid-shaped PTC element.

11. The PTC heating cell according to claim 1, wherein each metallization is disposed at an edge portion of its respective main side surfaces of the cuboid-shaped PTC element; and wherein the insulating layers are spaced inward from the edge portions of the main side surfaces by a distance equal to the width of the metallizations.

* * * * *